March 6, 1928. 1,661,290
J. E. JEWETT
NUTSCH FILTER
Filed April 8, 1927
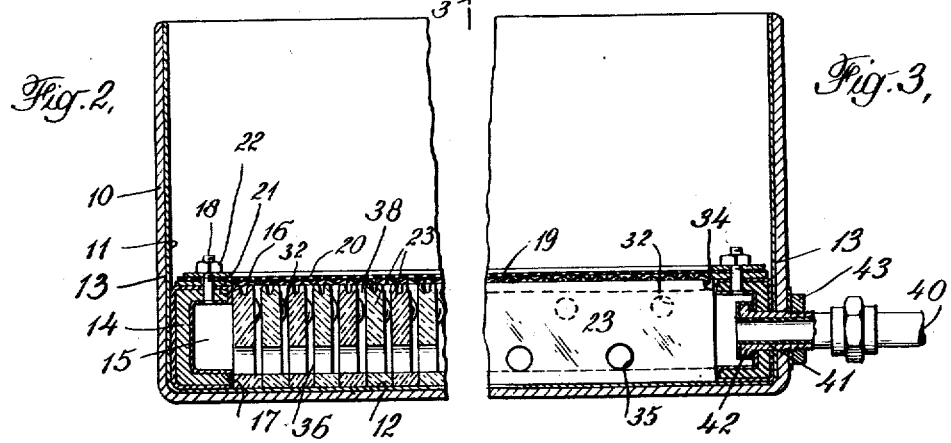
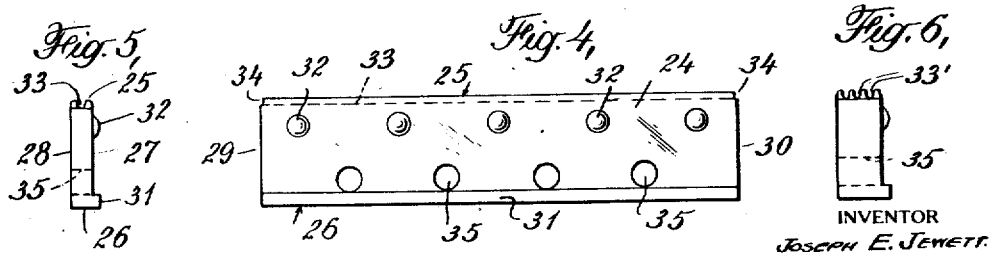
INVENTOR
Joseph E. Jewett.
BY
William J. Karoleke
ATTORNEY Patented Mar. 6, 1928.

1,661,290

UNITED STATES PATENT OFFICE.

JOSEPH E. JEWETT, OF BUFFALO, NEW YORK, ASSIGNOR TO NATIONAL ANILINE & CHEMICAL COMPANY, INC., OF NEW YORK, N. Y., A CORPORATION OF NEW YORK.

NUTSCH FILTER.

Application filed April 6, 1927. Serial No. 181,998.

This invention relates to filtering devices of the class known as Nutsch or suction filters in which liquid contained in a slurry passes or is drawn through a filtering medium supported by a suitable means over a collecting chamber for the liquid, while precipitate or cake is separated and deposited on the medium. More particularly it relates to the construction of filtering devices of this character which are adapted for the treatment of slurries containing acids. It also includes a novel form of filter flooring combining the functions of a supporting means for the filtering medium and collecting channels for the filtrate, and formed of a novel type of filtering tile.

The presence of acids, as a rule in commercial practice, demands lead lining or its equivalent of all parts which may be contacted thereby. But the filtering medium requires support for the material carried by it and the added suction load, as well as its own weight, and accordingly the usual Nutsch construction provides members connected to the sides of the container to transmit the load thereto. It is impractical to attempt the application of a non-adhering lead lining or sheathing to the structural elements required for this purpose because of the difficulty in fitting and holding the lining to the elements due to the vacuum employed.

The present invention provides a construction whereby it is practically feasible to use lead or its equivalent for lining tanks of any desired capacity of wood, iron, steel or other construction without perforating or subjecting such a lining to the danger of collapse, while supplying the necessary collecting chamber for the filtrate and an adequate support for the filtering medium. This is accomplished by omitting the usual side wall supports for the filtering medium, thus providing a tank free from protuberances or obstructions that interfere with lining the tank, and placing within the container, after lining, a construction that combines the functions of a collecting chamber with that of supporting the filtering medium. This construction comprises a flooring for the tank made of tile of such a shape that there is sufficient contact surface to support a superposed filtering medium without interference with the filtering operation or the collection and removal of filtrate.

A preferred embodiment of the invention is illustrated in the accompanying drawing in which Fig. 1 is a plan view of a filter, a portion of the filtering medium being removed to show the disposition of the tile forming the flooring;

Fig. 2 is an enlarged vertical section on the line 2—2 of Fig. 1;

Fig. 3 is an enlarged vertical section on the line 3—3 of Fig. 1;

Fig. 4 is a side elevation of a single tile;

Fig. 5 is an end view of the tile; and

Fig. 6 is an end view of a modified form of tile.

A container 10 of any desired shape, capacity, and material as for example steel, and preferably free from projections on the interior, has a lining 11 of lead, rubber or other equivalent. This lining covers the bottom 12 and sides 13, and the absence of projections avoids manipulation and dangers of exposure of the non-acid-resisting material beneath as well as the requirement of maintaining the lining in place over such projections. About the inner periphery and upon the bottom lining of the container there is fitted a member 14 providing a channel or drainage space 15, between upper and lower flanges 16 and 17, open to the interior of the container. The member 14 may be of any suitable material, such as lead, lead or rubber covered steel, or the like. Bolts 18 extend upwardly from upper flange 16, spaced at suitable distances, for engaging the edge of a screen 19 and filter cloth 20. A flat ring 21 engages the bolts and the filter cloth, and nuts 22 on the bolts draw the ring in close engagement with the cloth. The bolts and ring may be of any suitable metal such as aluminum bronze. Within the space bounded by the member 14, the screen 19 and the bottom 12, there is distributed tile 23 having the configuration shown in Fig. 3, 4 and 5, thus forming a flooring that rests on the bottom and supports the screen and filter cloth.

Each tile comprises a substantially rectangular block or plinth 24 which in vertical position has an upper edge 25, a lower edge 26, sides 27 and 28 and ends 29 and 30. From one side 27 there extends a continuous rectangular abutment 31 which is flush with the lower edge 26, and from the same side but adjacent or flush with the upper edge, there are spaced nodules, projections or protuberances 32, of spherical, cylindrical, or any other suitable shape, and extending substantially the same distance as the abutment from the block. The upper edge 25 is formed with a longitudinal groove 33 and a cross groove 34 at one corner. As shown in Fig. 5 there can be a plurality of channels or corrugations as 33', and the cross channel 34 can also be duplicated. Perforations 35 pass through the block and are preferably staggered with relation to the protuberances and flush with the upper face of the abutment. When these blocks are assembled within the tank, the abutments 31 in contact with the adjacent blocks provide a substantially continuous floor 36 resting on the bottom lining from which floor there extends the upper portion of the blocks in rows 37 held apart by the protuberances 32, thus providing channels 38. These channels are transversely connected by the perforations 35, and the cross grooves 34 connect the longitudinal grooves 33 with the channels. Drainage is thus provided in all directions to the peripheral member 14.

An outlet 40 projects from the channel member through the wall of the container. It consists of a nipple 41 having a flanged end 42 within the channel member 14 and a nut 43 threaded on the outer end to draw the flanged end into tight engagement with the member. The nipple may be of iron, lead covered, or other suitable construction. It is obvious that if member 14 be made of lead the nipple 41 may also be made of lead and attached solidly to member 14 by burning the joint.

The filter constructed as above described, is useful with any type of slurry and operates in a manner similar to filters of the Nutsch type. The tank is charged with the slurry and the filtrate travels through the filter cloth and screen into the channels 38 maintained between the blocks. These channels afford ample collecting space for filtrate, while at the same time the blocks are close enough to give an adequate and substantially uniform support to the filtering medium. From the channels, filtrate flows through the perforations 35 to other channels or directly into the drainage space of the peripheral member, and thence to the outlet 40. Suction can be applied at the outlet to hasten the filtering action.

Since the slurry space in the filter above the cloth is unobstructed, any suitable type of agitating means can be suspended therein to aid the filtering process.

I claim:

1. A filter comprising in combination a tank having a substantially flat bottom free from wall and bottom obstructions; a lining for the walls and bottom of the tank; a peripheral member on the bottom of the tank, said member having upper and lower flanges extending inwardly and forming a drainage space open to the interior of the tank; tile distributed throughout the space bounded by the member, said tile having a configuration providing in assembly a substantially continuous surface in contact with the bottom lining, a substantially uniform supporting surface for a filtering medium and channels leading to said member; a filtering medium on said tile and said member; means for securing said medium to the upper flange of said member; and an outlet from said member.

2. A tile for supporting a filtering medium within a tank comprising in combination a substantially rectangular block having substantially parallel sides and a corrugated top; and a continuous abutment extending from one of the sides the length of said block and flush with the bottom of said block, the side of said abutment being substantially parallel with the sides of said block.

3. A tile for supporting a filtering medium within a tank comprising in combination a block with substantially rectangular parallel sides, a continuous abutment of rectangular shape extending from one of the sides and flush with one edge of the block, and spaced spherical protuberances extending from the same side but adjacent the opposite edge of the block, said opposite edge having a longitudinal groove in its surface and a cross groove at one corner of the block, said block having perforations extending from one side to the other flush with said abutment and in staggered relation with respect to said protuberances.

4. A tile for supporting a filtering medium formed of vitreous material and having a flat bottom portion; a relatively narrow top portion, having a channel therein; and sides connecting the top and bottom portions, one of said sides joining said bottom portion at one edge, and the other of said sides joining said bottom portion at a point intermediate the two bottom edges, said first mentioned side and the opposite edge of said bottom portion being substantially parallel.

5. A tile for supporting a filtering medium formed of vitreous material and having a flat bottom portion; a relatively narrow top portion, having a channel therein; substantially parallel sides connecting the top and bottom portions, one of said sides joining said bottom portion at one edge, and the other of said sides joining said bottom portion at a point intermediate the two bottom edges, said first mentioned side and the opposite edge of said bottom portion being substantially parallel; and said block having a perforation running through said tile connecting said sides.

6. A tile for supporting a filtering medium formed of vitreous material and having a flat bottom portion; a relatively narrow top portion, having a channel therein; substantially parallel sides connecting the top and bottom portions, one of said sides joining said bottom portion at one edge, and the other of said sides joining said bottom portion at a point intermediate the two bottom edges, said first mentioned side and the opposite edge of said bottom portion being substantially parallel; and a nodule on said second mentioned side.

7. A tile for supporting a filtering medium formed of vitreous material and having a flat bottom portion; a relatively narrow top portion, having a channel therein; substantially parallel sides connecting the top and bottom portions. one of said sides joining said bottom portion at one edge, and the other of said sides joining said bottom portion at a point intermediate the two bottom edges, said first mentioned side and the opposite edge of said bottom portion being substantially parallel; and a nodule on said second mentioned side; said block having a perforation connecting the said two sides, said perforation contacting said bottom portion at its upper surface.

8. A tile for supporting a filtering medium within a tank comprising in combination a block with substantially rectangular parallel sides, a continuous abutment of rectangular shape extending from one of the sides and flush with one edge of the block, and spaced spherical protuberances extending from the same side but adjacent the opposite edge of the block, said opposite edge having a longitudinal groove in its surface and a cross groove at one corner of the block, said block having perforations extending from one side to the other flush with said abutment.

9. A filter floor for supporting a filtering medium comprising in combination tiles having a flat bottom portion, a relatively narrow top, parallel inner and outer sides, the outer of which joins the outer edge of said top to said bottom portion at one edge and the other of which joins the inner edge of said top to said bottom portion at a point intermediate the bottom edges thereby forming a ledge, said bottom edges being parallel, a longitudinal channel formed in said top, and nodules on the inner sides; said tiles being placed side by side and end to end, whereby a continuous floor is formed by the bottoms of said tiles between walls of adjacent tiles.

10. A filter floor for supporting a filtering medium comprising tiles laid side by side and end to end, said tiles having substantially rectangular parallel sides joining a top portion and a bottom portion, said portions being substantially parallel, said top portion having a longitudinal groove, and said bottom portion extending beyond the inner side and forming a ledge, the edges of said bottom portions being substantially parallel, nodules on the inner side of said tiles adjacent the top thereof projecting about the same distance from said side as said ledge, and said tiles having perforations connecting the sides, the lower edges of said perforations being contiguous to the upper surface of said ledge.

In testimony whereof I affix my signature.

JOSEPH E. JEWETT.

stantially parallel; and said block having a perforation running through said tile connecting said sides.

6. A tile for supporting a filtering medium formed of vitreous material and having a flat bottom portion; a relatively narrow top portion, having a channel therein; substantially parallel sides connecting the top and bottom portions, one of said sides joining said bottom portion at one edge, and the other of said sides joining said bottom portion at a point intermediate the two bottom edges, said first mentioned side and the opposite edge of said bottom portion being substantially parallel; and a nodule on said second mentioned side.

7. A tile for supporting a filtering medium formed of vitreous material and having a flat bottom portion; a relatively narrow top portion, having a channel therein; substantially parallel sides connecting the top and bottom portions, one of said sides joining said bottom portion at one edge, and the other of said sides joining said bottom portion at a point intermediate the two bottom edges, said first mentioned side and the opposite edge of said bottom portion being substantially parallel; and a nodule on said second mentioned side; said block having a perforation connecting the said two sides, said perforation contacting said bottom portion at its upper surface.

8. A tile for supporting a filtering medium within a tank comprising in combination a block with substantially rectangular parallel sides, a continuous abutment of rectangular shape extending from one of the sides and flush with one edge of the block, and spaced spherical protuberances extending from the same side but adjacent the opposite edge of the block, said opposite edge having a longitudinal groove in its surface and a cross groove at one corner of the block, said block having perforations extending from one side to the other flush with said abutment.

9. A filter floor for supporting a filtering medium comprising in combination tiles having a flat bottom portion, a relatively narrow top, parallel inner and outer sides, the outer of which joins the outer edge of said top to said bottom portion at one edge and the other of which joins the inner edge of said top to said bottom portion at a point intermediate the bottom edges thereby forming a ledge, said bottom edges being parallel, a longitudinal channel formed in said top, and nodules on the inner sides; said tiles being placed side by side and end to end, whereby a continuous floor is formed by the bottoms of said tiles between walls of adjacent tiles.

10. A filter floor for supporting a filtering medium comprising tiles laid side by side and end to end, said tiles having substantially rectangular parallel sides joining a top portion and a bottom portion, said portions being substantially parallel, said top portion having a longitudinal groove, and said bottom portion extending beyond the inner side and forming a ledge, the edges of said bottom portions being substantially parallel, nodules on the inner side of said tiles adjacent the top thereof projecting about the same distance from said side as said ledge, and said tiles having perforations connecting the sides, the lower edges of said perforations being contiguous to the upper surface of said ledge.

In testimony whereof I affix my signature.

JOSEPH E. JEWETT.

CERTIFICATE OF CORRECTION.

Patent No. 1,661,290.   Granted March 6, 1928, to

JOSEPH E. JEWETT.

It is hereby certified that error appears in the printed specification of the above numbered patent requiring correction as follows: Page 2, line 64, claim 1, after the word "bottom" insert a comma and the word ", and"; page 3, line 58, claim 9, for the word "sides" read "side" and line 72, claim 10, for the word "portions" read "portion"; and that the said Letters Patent should be read with these corrections therein that the same may conform to the record of the case in the Patent Office.

Signed and sealed this 29th day of May, A. D. 1928.

(Seal)

M. J. Moore,
Acting Commissioner of Patents.

CERTIFICATE OF CORRECTION.

Patent No. 1,661,290.               Granted March 6, 1928, to

JOSEPH E. JEWETT.

It is hereby certified that error appears in the printed specification of the above numbered patent requiring correction as follows: Page 2, line 64, claim 1, after the word "bottom" insert a comma and the word ", and"; page 3, line 58, claim 9, for the word "sides" read "side" and line 72, claim 10, for the word "portions" read "portion"; and that the said Letters Patent should be read with these corrections therein that the same may conform to the record of the case in the Patent Office.

Signed and sealed this 29th day of May, A. D. 1928.

M. J. Moore,